(12) United States Patent
Murasawa (10) Patent No.: US 6,551,511 B1
(45) Date of Patent: Apr. 22, 2003

(54) DENITRIFICATION PROMOTER AND A METHOD OF WATER TREATMENT USING THE SAME

(75) Inventor: Koichiro Murasawa, Osaka (JP)

(73) Assignee: Matsushita Electric Industrial Co. Ltd., Osaka (JP)

(*) Notice: Subject to any disclaimer, the term of this patent is extended or adjusted under 35 U.S.C. 154(b) by 0 days.

(21) Appl. No.: 09/583,181

(22) Filed: May 30, 2000

(30) Foreign Application Priority Data

May 31, 1999 (JP) ............................................. 11-151684

(51) Int. Cl.[7] .............................. C02F 3/30; C02F 3/10
(52) U.S. Cl. ....................... 210/610; 210/615; 210/620; 210/630; 210/903
(58) Field of Search ............................... 210/605, 610, 210/611, 615, 616, 617, 620–623, 630, 903, 908; 554/1

(56) References Cited

U.S. PATENT DOCUMENTS

| | | | |
|---|---|---|---|
| 3,878,303 A | * | 4/1975 | Hashimoto |
| 3,883,397 A | * | 5/1975 | Townsley |
| 4,247,597 A | | 1/1981 | Russell, Jr. |
| 4,382,873 A | * | 5/1983 | Gatellier et al. |
| 4,715,958 A | * | 12/1987 | Fuchs .......................... 210/605 |
| 4,810,385 A | * | 3/1989 | Hater et al. |
| 4,855,053 A | * | 8/1989 | Benedetti et al. ............ 210/634 |
| 5,037,551 A | * | 8/1991 | Barkley et al. |
| 5,085,766 A | * | 2/1992 | Born |
| 5,316,832 A | | 5/1994 | Groten et al. |
| 5,443,845 A | * | 8/1995 | Felix |
| 5,725,885 A | * | 3/1998 | Felix et al. |
| 5,994,120 A | * | 11/1999 | Giordano et al. |
| 6,183,642 B1 | * | 2/2001 | Heijnen et al. |
| 6,214,619 B1 | * | 4/2001 | Sato et al. |
| 6,277,279 B1 | * | 8/2001 | Hruza |
| 6,303,367 B1 | * | 10/2001 | Kataoka et al. ............ 435/262.5 |

FOREIGN PATENT DOCUMENTS

| | | |
|---|---|---|
| DE | 34 10 412 | 10/1985 |
| DE | 198 59 054 | 7/2000 |
| EP | 0 849 228 | 6/1998 |
| GB | 584971 | 1/1947 |
| JP | 2-90998 A | * 3/1990 |
| JP | 06-126298 | 5/1994 |
| JP | 08-224076 | 9/1996 |
| JP | 09-299986 | 11/1997 |
| JP | 10-085782 | 4/1998 |
| JP | 10-314782 | 12/1998 |
| NL | 8 000 300 | 8/1981 |

OTHER PUBLICATIONS

Patent Abstracts of Japan, Denitrifying Material Used for Water Treatment and Water Treatment Using This Material. Nov. 1997.

Database WPI Abstract, XP–002147122, Section Ch, week 9610, Derwent Publ. Ltd., London, GB, Jun. 1995.

The Proceedings of the 32nd Symposium on the Study of Sewage Systems, p. 433 (See Spec pp. 1–2).

* cited by examiner

Primary Examiner—Fred Prince
(74) Attorney, Agent, or Firm—Pearne & Gordon LLP

(57) ABSTRACT

To provide technology in denitrification promoters for typical use in wastewater treatment and methods of water treatment using such denitrification promoters, which allows nitrification and denitrification to be accomplished simultaneously in water treatment facilities using a single aerobic tank without continuous addition of methanol or other hydrogen donors that has caused difficulties in the prior art. A straight-chained saturated monocarboxylic acid having at least 6 carbon atoms or a primary alcohol having at least 12 carbon atoms is used as a main component of the denitrification promoter, which may be shaped into particles no larger than 100 mm and added into an aerobic tank, an anaerobic tank or a settling tank.

29 Claims, 3 Drawing Sheets

DENITRIFICATION PROMOTER AND A METHOD OF WATER TREATMENT USING THE SAME

DETAILED DESCRIPTION OF INVENTION

1. Technical Field of Invention

The present invention relates to denitrification promoters for typical use in wastewater treatment and methods of water treatment using such denitrification promoters.

2. Prior Art

A method extensively used in the conventional wastewater treatment to perform denitrifying reactions comprises providing tanks in which aerobic and anaerobic environments are individually formed (and which are hereunder referred to as "an aerobic tank" and "an anaerobic tank", respectively) and continuously supplying the anaerobic tank with methanol or other hydrogen donors to microorganisms responsible for denitrification.

Recently proposed techniques include the use of shaped polyvinyl alcohol gel or the like to achieve both nitrification and denitrification in a single tank (see, for example, Unexamined Published Japanese Patent Application (kokai) No. 314782/1998) and supporting nitrifying or denitrifying organisms per se on organic polymer gel by inclusion or other methods of immobilization with a view to achieving higher efficiency (see, for example, Unexamined Published Japanese Patent Application (kokai) No. 224076/1996).

Prior art techniques for hydrogen donors other than methanol include the use of carboxylic acids having not more than 3 carbon atoms (see Unexamined Published Japanese Patent Application (kokai)JP-A No. 126298/1994), low-molecular weight saccharides (Unexamined Published Japanese Patent Application (kokai) JP-A No. 299986/1997) and biodegradable resins (Unexamined Published Japanese Patent Application (kokai) JP-A No. 85782/1998 and the Proceedings of the 32nd Symposium on the Study of Sewage Systems, p. 433).

However, these conventional techniques have had their own problems. The shaped polyvinyl alcohol and the like in fact are not effective hydrogen donors to denitrifying organisms and the efficiency in denitrification is very low.

The nitrifying or denitrifying organisms carried on supports by inclusion or other methods of immobilization cannot be stored indefinitely for the structural reason of immobilizing the organisms and, in addition, special production techniques have been necessary.

The carboxylic acids having not more than 3 carbon atoms and the low-molecular weight saccharides have such high water solubility that they disappear too rapidly in wastewater to claim a marked difference in effectiveness from the prior art technique of continuously adding methanol and other liquid hydrogen donors.

The use of biodegradable resins has a difficulty in that the biodegradable resins that can serve as hydrogen donors to denitrifying organisms are practically limited to hydroxybutyric acid based polymers, as well as alloy compositions of starch and vinyl chloride but commercial use of these products is difficult to realize for economical reasons.

SUMMARY OF THE INVENTION

The present invention has been accomplished under these circumstances and has as the primary object providing an inexpensive technique of prolonged effectiveness that allows nitrification and denitrification to be accomplished simultaneously in water treatment facilities using a single aerobic tank (an aeration tank only) without continuous addition of methanol or other hydrogen donors.

As a result of the intensive studies they conducted in order to solve the aforementioned problems of the prior art, the present inventors found the following: using certain classes of chemical substances having specified numbers of carbon atoms and specified chemical structures gave an appreciable denitrification promoting effect that was higher than in the prior art; an even greater denitrification promoting effect was achieved by supporting those classes of specified chemical substances on another class of specified chemical substances; in the actual wastewater treatment using such classes of chemical substances, the intended denitrification promoting effect was achieved by forming those chemical substances into specified particle sizes or shapes, or enclosing them with nonwoven fabric or nets having specified values of areal density or mesh opening, or immobilizing them on strings. The present invention has been accomplished on the basis of these findings.

The denitrification promoter according to the first aspect of the invention and the method of water treatment using said denitrification promoter according to the second aspect of the invention have the following characteristic features.

A first aspect of the invention is a denitrification promoter based on a carboxylic acid having at least 6 carbon atoms which, in particular, is a straight-chained saturated monocarboxylic acid.

A second aspect of the invention is a method of water treatment in which the denitrification promoter according to the first aspect are added into an aerobic tank, an anaerobic tank or a settling tank.

DESCRIPTION OF THE PREFERRED EMBODIMENTS

Implementations of the invention are as follows.
1. A denitrification promoter based on a carboxylic acid having at least 6 carbon atoms which, in particular, is a straight-chained saturated monocarboxylic acid.
2. A denitrification promoter based on an alcohol having at least 12 carbon atoms which, in particular, is a primary alcohol.
3. A denitrification promoter in which a straight-chained saturated monocarboxylic acid having at least 6 carbon atoms is supported on a carrier based on cellulose, polyvinyl alcohol or polyethylene glycol.
4. A denitrification promoter in which an alcohol having at least 12 carbon atoms is supported on a carrier based on cellulose, polyvinyl alcohol or polyethylene glycol.

5. A method of water treatment in which particles of the above-mentioned denitrification promoter having a size of no more than 100 mm are added into an aerobic tank, an anaerobic tank or a settling tank.
6. A method of water treatment in which the above-mentioned denitrification promoter that is contained either in a bag formed of nonwoven fabric having an areal density in a specified range or in a box consisting of meshed walls having openings of a specified size is installed in an aerobic tank, an anaerobic tank or a settling tank.
(7) A method of water treatment in which the above-mentioned denitrification promoter is shaped to a bar (plate) or rod having at least one convex or concave surface and installed in an aerobic tank, anaerobic tank or a settling tank.
8. A method of water treatment in which the above-mentioned denitrification promoter is immobilized on a string or a woven or nonwoven fabric sheet and installed in an aerobic tank, an anaerobic tank or a settling tank.

Hereafter Modes for Carrying Out the Invention will be described.

The carboxylic acid to be used in the invention must have at least 6 carbon atoms and this is one of the greatest differences the present invention has as compared with the already-described prior art techniques.

Carboxylic acids with less than 6 carbon atoms have such high solubilities in water that even if they serve as hydrogen donors to denitrifying organisms, they lose shape in a short time and the result is not at all different from the continuous addition of methanol which is a typical prior art method of denitrification.

Considering the purport of the invention, there is no particular need to set the upper limit for the number of carbon atoms in the carboxylic acid to be used in the invention, provided that 18 would be the approximate number of carbon atoms in carboxylic acids that are commercially available in large quantities. Needless to say, the present invention is not limited to those carboxylic acids having up to 18 carbon atoms.

The carboxylic acid to be used in the embodiment under consideration preferably has a straight-chained structure and it is more preferably a straight-chained saturated monocarboxylic acid.

Carboxylic acids having side chains and so-called "dicarboxylic acids" have steric hindrance that prevents easy cleavage of bonds by denitrifying organisms and, hence, they are not efficient hydrogen donors. Unsaturated carboxylic acids having double bonds are also inefficient hydrogen donors due to their $\pi$electrons.

Carboxylic acids meeting these requirements are exemplified by caprylic acid, capric acid, lauric acid, myristic acid, palmitic acid and stearic acid, as well as salts, hydroxy acids and esters of these carboxylic acids.

These carboxylic acids are low in water solubility and, in addition, they are saturated monocarboxylic acids having a straight-chained structure; hence, they are reasonably useful as hydrogen donors and the rate of denitrifying reactions can be increased by adding them into the anaerobic tank after shaping them into suitable forms or carrying them on suitable carriers. The low water solubility of these carboxylic acids has the added advantage of eliminating the need of the prior art for adding methanol and other hydrogen donors continuously, thereby enabling the denitrifying reactions to be carried out for a prolonged period of time.

The alcohol to be used in the invention must have at least 12 carbon atoms and this is another greatest difference the present invention has as compared with the already-described prior art techniques.

Alcohols with less than 12 carbon atoms have such high solubilities in water that even if they serve as hydrogen donors to denitrifying organisms, they lose shape in a short time.

Considering the purport of the invention, there is no particular need to set the upper limit for the number of carbon atoms in the alcohol to be used in the invention, provided that 20 would be the approximate number of carbon atoms in alcohols that are commercially available in large quantities. Needless to say, the present invention is not limited to those alcohols having up to 20 carbon atoms.

The alcohol to be used in the embodiment under consideration is preferably a primary alcohol.

Secondary and higher alcohols have steric hindrance that prevents easy cleavage of bonds by denitrifying organisms and, hence, they are not efficient hydrogen donors. It should, however, be noted that secondary and higher alcohols may be used as needed although they are not as efficient as primary alcohols.

Alcohols meeting these requirements are exemplified by tetradecyl alcohol, hexadecyl alcohol, octadecyl alcohol, eicosanol and myricyl alcohol, as well as branched higher alcohols (dimers of these alcohols) and esters of these alcohols with organic acids.

These alcohols are low in water solubility and, in addition, they are primary alcohols; hence, they are reasonably useful as hydrogen donors and the rate of denitrifying reactions can be increased by adding them into the anaerobic tank after shaping them into suitable forms or carrying them on suitable carriers. The low water solubility of these alcohols has the added advantage of eliminating the need of the prior art for adding methanol and other hydrogen donors continuously, thereby enabling the denitrifying reactions to be carried out for a prolonged period of time.

In the embodiment under consideration, carrying the principal component carboxylic acid or alcohol on suitable carriers is preferred since they control the contact between the principal component and wastewater while limiting internal diffusion of oxygen to thereby enable the creation of a more anaerobic condition.

Preferred carriers are highly biocompatible materials such as cellulose, polyvinyl alcohol and polyethylene glycol.

The carboxylic acid and alcohol to be used in the embodiment under consideration can be easily shaped by a conventional method such as one which consists of the steps of heating them to a temperature higher than their melting point, placing the melt in a mold and thereafter cooling it to solidify.

One of the most salient features of the embodiment under consideration is that even if the carboxylic acid or alcohol to be used in the invention is directly added into an aerobic tank, denitrifying reactions occur and proceed simultaneously with nitrifying reactions.

To state more specifically, if the carboxylic acid or alcohol to be used in the embodiment under consideration is shaped into particles not larger than 100 mm in size and added into an aerobic tank, the flow of the aerating gas or water streams cause the particles to move around in the tank; at the interface between the carboxylic acid or alcohol and the water, local pressure drop occurs due to so-called "Bernouilli's principle" and even in the aerobic tank, an anaerobic environment can locally be created to favor the progress of denitrifying reactions.

To insure motility within the tank, it is essential that the particle size of the carboxylic acid or alcohol to be used in the embodiment under consideration be no more than 100 mm. If the particles are larger than 100 mm, their momentum is insufficient to cause the required local pressure drop.

The carboxylic acid or alcohol to be used in the embodiment under consideration is preferably added into the tank after being immobilized on strings or shaped into bar or rod because this not only prevents the carboxylic acid or alcohol from flowing out of the tank but also facilitates their recovery and replacement.

Even if the carboxylic acid or alcohol to be used in the embodiment under consideration is fixed in the tank either as an attachment to strings or as bars or rods, water streams created within the tank help produce interfacial local pressure drop which is favorable to the progress of denitrifying reactions.

The carboxylic acid or alcohol to be used in the embodiment under consideration can be easily immobilized on strings or woven or nonwoven fabric sheets by the following method: strings or woven or nonwoven fabric sheets that are made of natural fibers such as cotton or silk or synthetic fibers such as polyethylene, polyvinyl chloride and carbon fiber are immersed in a dispersion having the carboxylic acid or alcohol dispersed in an emulsion-type adhesive or the like and they are then recovered from the dispersion and dried off.

If the carboxylic acid or alcohol to be used in the embodiment under consideration is shaped into bar or rod before they are added into the tank, at least one low spot or recess is preferably formed in the bar or rod since this not only increases their surface area but also limits the water flow in that area, thereby facilitating the creation of an anaerobic condition.

If the incoming wastewater has high concentration of organic matter or if the water temperature is not high enough to provide the desired rate of microbial reactions, especially high denitrifying performance may be required.

In such cases, the denitrifying performance has to be enhanced by creating a more anaerobic condition. To this end, the carboxylic acid or alcohol to be used in the invention is preferably contained in a water-infiltrable bag or box.

The bag suitable for this purpose is preferably made of nonwoven or woven fabric having an areal density of from 5 g/m$^2$ to 45 g/m$^2$. The box suitable for the same purpose is preferably made of meshed walls having openings ranging from 20 μm to 4 cm in size.

If the areal density and the mesh opening are less than 5 g/m$^2$ and 20 μm, respectively, the blockage of incoming water is too great to permit effective denitrifying reactions. If the areal density and the mesh opening exceed 45 g/m$^2$ and 4 cm, respectively, water is admitted so easily that the desired anaerobic condition is not created.

EXAMPLES

The following examples are provided for the purpose of further illustrating the present invention but are in no way to be taken as limiting.

Figure 1:
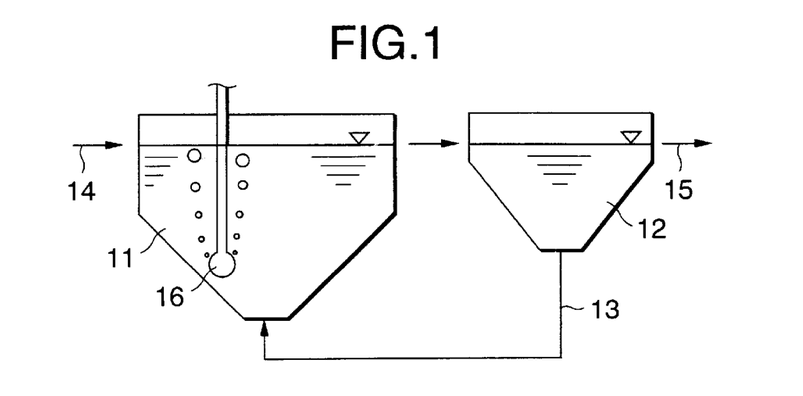
FIG. 1 is a diagram showing the layout of the standard activated-sludge treatment apparatus employed in Examples of the invention.
Figure 2:
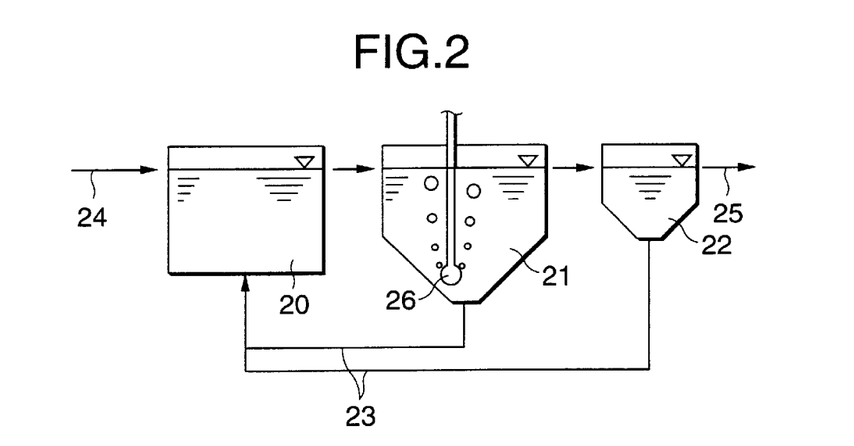
FIG. 2 is a diagram showing the layout of the standard recirculating water treatment apparatus employed in the other Examples of the invention.

Unless otherwise noted, all evaluations in the examples were conducted using a standard activated-sludge water treatment apparatus the layout of which is shown in FIG. 1 (and which is hereunder referred to as "apparatus 1" having no denitrifying tank) or a standard recirculating water treatment apparatus the layout of which is shown in FIG. 2 (and which is hereunder referred to as "apparatus 2" having a denitrifying tank provided upstream of an aeration tank so that part of the BOD in the influent is recirculated for use in denitrification).

Referring to FIG. 1, raw water is introduced into an aerobic tank 11 via a conduit 14 and subjected to aerobic treatment with air generated by a diffuser 16.

The aerobically treated water is then introduced into a settling tank 12 where it is stripped of solids and sludge and the effluent is discharged through an outlet 15.

A portion of the separated sludge is returned to the aerobic tank 11 via a return path 13 for second use.

Referring to FIG. 2, raw water is first introduced into an anaerobic tank 20 via a conduit 24 and then into an aerobic tank 21, where it is subjected to aerobic treatment with air generated by a diffuser 26.

The aerobically treated water is then introduced into a settling tank 22 where it is stripped of solids and sludge and the effluent is discharged through an output 25.

A portion of the separated sludge is returned to the anaerobic tank 20 via a return path 23 for use as a hydrogen donor to denitrifying organisms.

For the process description of each apparatus, see below.

(1) Raw water: Sewage subjected to secondary treatment was adjusted to a total nitrogen content of 60 ppm by treatment with a mixture of ammonium chloride and potassium nitrate in a weight ratio of 5:1.

(2) Operating conditions

Incoming raw water: 5 L/day

Sludge return: 38% (relative to raw water)

Recirculation ratio: 4 (in apparatus 2)

Aeration: 2 L/min

Initial sludge: 5 L of the activated sludge that was collected from the activated-sludge tank in the Welfare House at the headquarters of Matsushita Sangyo Kiki Co., Ltd. and which was adjusted to an MLSS of 4500 ppm was initially charged into the aeration tank.

Temperature: Each tank was controlled at 25° C. within an insulator.

(3) Scale of apparatus

Aerobic tank (aeration tank): 5.2 L (for both apparatus)

Anaerobic tank (denitrifying tank): 10 L (in apparatus 2)

Settling tank: 2.5 L (for both apparatus)

(4) Measurement of water quality

The total nitrogen content at the outlet of each apparatus was determined by the total method described in JIS K0101.

Example 1

Capric acid (guaranteed reagent) was heated to 85° C. in a single-screw extruder, from which it was extruded into water through a die 1.5 mm in diameter to produce granules of capric acid that were about 2 mm in diameter.

The capric acid granules (10 g or 20 g) were charged into the aerobic tank in apparatus 1 and the total nitrogen content at the outlet was measured 24 hours later.

As a comparison, the same experiment was conducted except that no capric acid granules were charged. The total nitrogen content at the outlet was calculated by the same method.

The results of the respective experiments are shown in Table 1 as Example 1 and Comparative Example 1.

TABLE 1

|  | Total N at outlet, ppm |
|---|---|
| Example 1 (10 g of capric acid added) | 19.6 |
| Example 1 (20 g of capric acid added) | 8.1 |
| Comparative Example 1 (capric acid not added) | 62.0 |

As Table 1 shows, when the denitrification promoter of Example 1 was added, the total nitrogen content at the outlet was appreciably lower than in the comparative case (corresponding to the conventional standard activated-sludge method); the decrease was particularly great when 20 g of the promoter was added.

Example 2

Lauric acid (guaranteed reagent) was heated to 95° C. in a single-screw extruder, from which it was extruded into water through a die 1.5 mm in diameter to produce granules of lauric acid that were about 2 mm in diameter.

The lauric acid granules (20 g) were charged into the aerobic tank in apparatus 1 and the total nitrogen content at the outlet was measured 24 hours later.

As a comparison, the same experiment was conducted except that no lauric acid granules were charged. The total nitrogen content at the outlet was calculated by the same method.

The results of the respective experiments are shown in Table 2 as Example 2 and Comparative Example 2.

TABLE 2

|  | Total N at outlet, ppm |
|---|---|
| Example 2 (20 g of lauric acid added) | 9.5 |
| Comparative Example 2 (lauric acid not added) | 59.4 |

As Table 2 shows, when the denitrification promoter of Example 2 was added, the total nitrogen content at the outlet was considerably lower than in the comparative case (corresponding to the conventional standard activated-sludge method).

Example 3

In order to see whether the carboxylic acid to be used in the invention would also be effective in the form of a salt or an ester, methyl caprate and sodium caprate (both guaranteed reagent) were heated to 85° C. in a single-screw extruder, from which they were extruded into water through a die 1.5 nm in diameter to produce granules of methyl caprate and sodium caprate that were about 2 mm in diameter.

The granules of methyl caprate or sodium caprate (20 g) were charged into the aerobic tank in apparatus 1 and the total nitrogen content at the outlet was measured 24 hours later.

As a comparison, the same experiment was conducted except that no caprate granules were charged. The total nitrogen content at the outlet was calculated by the same method.

The results of the respective experiments are shown in Table 3 as Example 3 and Comparative Example 3.

TABLE 3

|  | Total N at outlet, ppm |
|---|---|
| Example 3 (20 g of methyl caprate added) | 18.7 |
| Example 3 (20 g of sodium caprate added) | 24.6 |
| Comparative Example 3 (no caprate added) | 55.1 |

As Table 3 shows, when the denitrification promoters of Example 3 were added, the total nitrogen content at the outlet was considerably lower than in the comparative case (corresponding to the conventional standard activated-sludge method); it was therefore verified that the building block of the carboxylic acid contributed the desired denitrifying effect (it was also effective in the form of a salt and an ester).

Example 4

Capric acid (guaranteed reagent) was heated to melt at 85° C., forced into porous cellulose pellets (2 mm in diameter with a bulk specific gravity of about 0.1) under pressure and thereafter cooled slowly to prepare granules of capric acid on cellulose.

Twenty grams of the granules of capric acid on cellulose were charged into the aerobic tank in apparatus 1 and the total nitrogen content at the outlet was measured 24 hours later.

Two comparative experiments were run by the same procedure, except that no granules of capric acid on cellulose were added or only the porous cellulose pellets were used. The total nitrogen content at the outlet was calculated by the same method.

The results of the respective experiments are shown in Table 4 as Example 4 and Comparative Example 4.

TABLE 4

|  | Total N at outlet, ppm |
|---|---|
| Example 4 (granules of capricacid on cellulose added in 20 g) | 4.0 |
| Comparative Example 4 (no promoter added) | 63.8 |
| Comparative Example 4 (only porous cellulose pellets added) | 54.2 |

As Table 4 shows, when the denitrification promoter of Example 4 was added, the total nitrogen content at the outlet was considerably lower than when no promoter was added (as in the conventional standard activated-sludge method) and when only the porous cellulose pellets were added.

Example 5

An aqueous suspension comprising 10 wt % of PVA with an average degree of polymerization of 1500, 1 wt % of sodium alginate and 25% of capric acid (guaranteed reagent) was added dropwise to aqueous calcium chloride (0.2 moles/L) to prepare granules of PVA-included capric acid.

The same method was repeated, except that PVA was replaced by polyethylene glycol (PEG) having an average molecular weight of 400; as a result, granules of PEG-included capric acid were prepared.

Twenty grams of each type of granules were charged into the aerobic tank in apparatus 1 and the total nitrogen content at the outlet was measured 24 hours later.

Three comparative experiments were run by the same procedure, except that neither type of capric acid granules were added, or capric acid was removed from each type of granules (only PVA or PEG was added). The total nitrogen content at the outlet was calculated by the same method.

The results of the respective experiments are shown in Table 5 as Example 5 and Comparative Example 5.

TABLE 5

| | Total N at outlet, ppm |
|---|---|
| Example 5 (20 g of capric acid/PVA granules added) | 4.9 |
| Example 5 (20 g of capric acid/PEG granules added) | 3.3 |
| Comparative Example 5 (no promoter added) | 60.4 |
| Comparative Example 5 (only PVA granules added) | 51.9 |
| Comparative Example 5 (only PEG granules added) | 51.6 |

As Table 5 shows, when the denitrification promoter of Example 5 was added, the total nitrogen content at the outlet was considerably lower than when no promoter was added (as in the conventional standard activated-sludge method) and when only the PVA or PEG granules were added.

Example 6

Tetradecyl alcohol (guaranteed reagent) was heated to 85° C. in a single-screw extruder, from which it was extruded into water through a die 1.5 mm in diameter to produce granules of tetradecyl alcohol that were about 2 mm in diameter.

The granules of tetradecyl alcohol (20 g) were charged into the aerobic tank in apparatus 1 and the total nitrogen content at the outlet was measured 24 hours later.

As a comparison, the same experiment was conducted except that no granules of tetradecyl alcohol were charged. The total nitrogen content at the outlet was calculated by the same method.

The results of the respective experiments are shown in Table 6 as Example 6 and Comparative Example 6.

TABLE 6

| | Total N at outlet, ppm |
|---|---|
| Example 6 (20 g of tetradecyl alcohol added) | 10.8 |
| Comparative Example 6 (tetradecyl alcohol not added) | 61.6 |

As Table 6 shows, when the denitrification promoter of Example 6 was added, the total nitrogen content at the outlet was considerably lower than in the comparative case (corresponding to the conventional standard activated-sludge method).

The granules of tetradecyl alcohol (50 g) were added into a water tank containing about 60 L of water, in which 10 goldfish (each weighing about 30 g) were kept with the water being recirculated and filtered. The amount of nitrate nitrogen as measured on the 90th day was about a third of the value for the system where no granules of tetradecyl alcohol were added. Thus, the denitrification promoter of Example 6 was found to be effective in a water recirculating environment.

Example 7

Hexadecyl alcohol (guaranteed reagent) was heated to 85° C. in a single-screw extruder, from which it was extruded into water through a die 1.5 mm in diameter to produce granules of hexadecyl alcohol that were about 2 mm in diameter.

The granules of hexadecyl alcohol (20 g) were charged into the aerobic tank in apparatus 1 and the total nitrogen content at the outlet was measured 24 hours later.

As a comparison, the same experiment was conducted except that no granules of hexadecyl alcohol were charged. The 24-hr total nitrogen content at the outlet was calculated by the same method.

The results of the respective experiments are shown in Table 7 as Example 7 and Comparative Example 7.

TABLE 7

| | Total N at outlet, ppm |
|---|---|
| Example 7 (20 g of hexadecyl alcohol added) | 7.7 |
| Comparative Example 7 (hexadecyl alcohol not added) | 59.0 |

As Table 7 shows, when the denitrification promoter of Example 7 was added, the total nitrogen content at the outlet was considerably lower than in the comparative case (corresponding to the conventional standard activated-sludge method).

The granules of hexadecyl alcohol (50 g) were added into a water tank containing about 60 L of water, in which 10 goldfish (each weighing about 30 g) were kept with the water being recirculated and filtered. The amount of nitrate nitrogen as measured on the 90th day was about a fourth of the value for the system where no granules of hexadecyl alcohol were added. Thus, the denitrification promoter of Example 7 was found to be effective in a water recirculating environment.

Example 8

In order to see whether the alcohol to be used in the invention would also be effective in the form of an ester, myricyl palmitate (also known as "beeswax"; guaranteed reagent) was heated to 85° C. in a single-screw extruder, from which it was extruded into water through a die 1.5 mm in diameter to produce granules of myricyl palmitate that were about 2 mm in diameter.

The granules of myricyl palmitate (20 g) were charged into the aerobic tank in apparatus 1 and the total nitrogen content at the outlet was measured 24 hours later.

As a comparison, the same experiment was conducted except that no granules of myricyl palmitate were charged. The total nitrogen content at the outlet was calculated by the same method.

The results of the respective experiments are shown in Table 8 as Example 8 and Comparative Example 8.

TABLE 8

| | Total N at outlet, ppm |
|---|---|
| Example 8 (20 g of myricyl palmitate added) | 20.4 |
| Comparative Example 8 (no promoter added) | 60.3 |

As Table 8 shows, when the denitrification promoter of Example 8 was added, the total nitrogen content at the outlet was considerably lower than in the comparative case (corresponding to the conventional standard activated-sludge method); it was therefore verified that the alcohol to be used in the invention was also effective in the form of an ester with an organic acid.

Example 9

Hexadecyl alcohol (guaranteed reagent) was heated to melt at 85° C., forced into porous cellulose pellets (2 mm in diameter with a bulk specific gravity of about 0.1) under pressure and thereafter cooled slowly to prepare granules of hexadecyl on cellulose.

Twenty grams of the granules of hexadecyl alcohol on cellulose were charged into the aerobic tank in apparatus 1 and the total nitrogen content at the outlet was measured 24 hours later.

As a comparison, the same experiment was conducted except that no granules of hexadecyl alcohol on cellulose were charged. The total nitrogen content at the outlet was calculated by the same method.

The results of the respective experiments are shown in Table 9 as Example 9 and Comparative Example 9.

TABLE 9

| | Total N at outlet, ppm |
|---|---|
| Example 9 (granules of hexadecyl alcohol on cellulose added in 20 g) | 3.2 |
| Comparative Example 9 (no promoter added) | 57.5 |

As Table 9 shows, when the denitrification promoter of Example 9 was added, the total nitrogen content at the outlet was considerably lower than when no promoter was added (as in the conventional standard activated-sludge method).

An aqueous suspension comprising 10 wt % of PVA with an average degree of polymerization of 1500, 1 wt % of sodium alginate and 20% of hexadecyl alcohol (guaranteed reagent) was added dropwise to aqueous calcium chloride (0.2 moles/L) to prepare granules of PVA-included hexadecyl alcohol.

The same method was repeated, except that PVA was replaced by polyethylene glycol (PEG) having an average molecular weight of 400; as a result, granules of PEG-included hexadecyl alcohol were prepared.

Twenty grams of each type of granules were charged into the aerobic tank in apparatus 1 and the total nitrogen content at the outlet was measured 24 hours later.

As a comparison, the same experiment was conducted except that neither type of hexadecyl alcohol granules were charged. The 24-hr total nitrogen content at the outlet was calculated by the same method.

The results of the respective experiments are shown in Table 10 as Example 10 and Comparative Example 10.

TABLE 10

| | Total N at outlet, ppm |
|---|---|
| Example 10 (20 g of hexadecyl alcohol/PVA granules added) | 4.6 |
| Example 10 (20 g of hexadeyl alcohol/PEG granules added) | 8.2 |
| Comparative Example 10 (no promoter added) | 64.6 |

As Table 10 shows, when the denitrification promoter of Example 10 was added, the total nitrogen content at the outlet was considerably lower than when no promoter was added (as in the conventional standard activated-sludge method).

Example 11

Twenty grams of the capric acid granules prepared in Example 1 were charged into each of the anaerobic and settling tanks in apparatus 2 and the total nitrogen content at the outlet was measured 24 hours later.

Two comparative experiments were run by the same procedure, except that no capric acid granules were charged or methanol was added into the anaerobic tank at a constant rate of 45 ppm/hr. The 24-hr total nitrogen content was measured by the same method.

The results of the respective experiments are shown in Table 11 as Example 11 and Comparative Example 11.

TABLE 11

| | Total N at outlet, ppm |
|---|---|
| Example 11 (capric acid granules added into anaerobic tank) | 10.4 |
| Example 11 (capric acid granules added into settling tank) | 2.7 |
| Comparative Example 11 (no promoter added) | 28.6 |
| Comparative Example 11 (methanol added into anaerobic tank at 45 ppm/hr) | 12.6 |

As Table 11 shows, irrespective of whether the denitrification promoter of Example 11 was added into the anaerobic tank or the settling tank, the total nitrogen content decreased as much as in the comparative case of adding methanol at a constant rate. In addition, a single addition of the promoter was sufficient for the initial effect to last for about 3 months.

Example 12

Twenty grams of the hexadecyl alcohol granules prepared in Example 7 were charged into each of the anaerobic and settling tanks in apparatus 2 and the total nitrogen content at the outlet was measured 24 hours later.

Two comparative experiments were run by the same procedure, except that no hexadecyl alcohol granules were charged or methanol was added into the anaerobic tank at a constant rate of 45 ppm/hr. The 24-hr total nitrogen content was measured by the same method.

The results of the respective experiments are shown in Table 12 as Example 12 and Comparative Example 12.

TABLE 12

| | Total N at outlet, ppm |
|---|---|
| Example 12 (hexadecyl alcohol granules added into anaerobic tank) | 7.6 |
| Example 12 (hexadecyl alcohol granules added into settling tank) | 6.1 |
| Comparative Example 12 (no promoter added) | 20.1 |
| Comparative Example 12 (methanol added into anaerobic tank at 45 ppm/hr) | 9.4 |

As Table 12 shows, irrespective of whether the denitrification promoter of Example 12 was added into the anaerobic tank or the settling tank, the total nitrogen content decreased as much as in the comparative case of adding methanol at a constant rate. In addition, a single addition of the promoter was sufficient for the initial effect to last for about 2.5 months.

Example 13

Twenty grams of the capric acid granules prepared in Example 1 were put into a bag made of nonwoven polypropylene fabric having an areal density of 28 g/cm². The opening of the bag was closed by fusion to prepare a denitrification promoter of the shape shown in FIG. 3.

Figure 3:
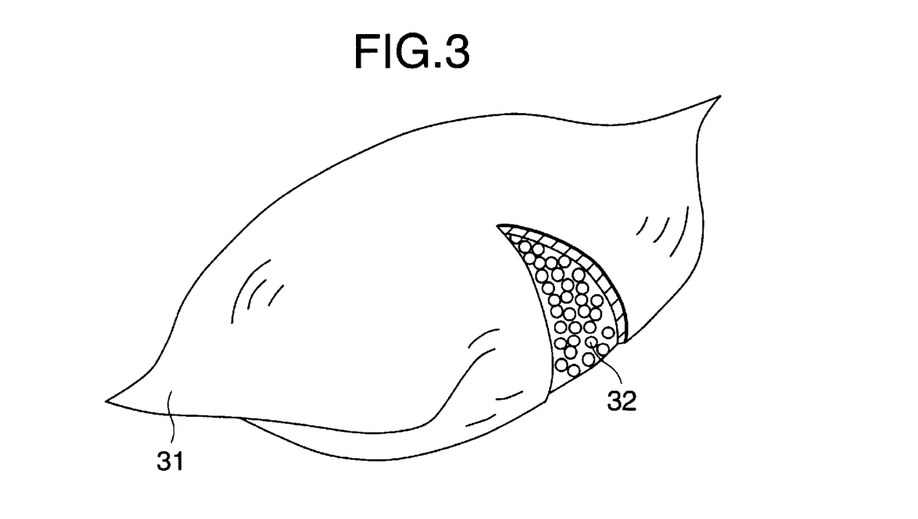
FIG. 3 is a sketch of the denitrification promoter used in Example 13.

In FIG. 3, numeral 31 refers to the bag made of nonwoven fabric having an areal density of 28 g/cm² and 32 refers to the capric acid granules contained in the bag.

The nonwoven fabric was shaped into a bag to prevent spillage of the capric acid granules which, however, were capable of contact with water (such as wastewater) passing through the nonwoven fabric.

A string was attached to the thus prepared denitrification promoter, which was then charged into each of the aerobic, anaerobic and settling tanks in apparatus 2. The total nitrogen content at the outlet was measured 24 hours later.

As a comparison, the same experiment was conducted except that no promoter was charged. The total nitrogen content was measured by the same method.

The results of the respective experiments are shown in Table 13 as Example 13 and Comparative Example 13.

TABLE 13

| | Total N at outlet, ppm |
|---|---|
| Example 13 (promoter added into aerobic tank) | 8.6 |
| Example 13 (promoter added into anaerobic tank) | 9.1 |
| Example 13 (promoter added into settling tank) | 10.3 |
| Comparative Example 13 (no promoter added) | 22.6 |

As Table 13 shows, irrespective of whether the denitrification promoter of Example 13 was added into the aerobic tank, anaerobic tank or the settling tank, the total nitrogen content was lower than in the comparative case where no promoter was added.

The denitrification promoter of Example 13 is protected against spillage from tanks. In addition, if it becomes necessary to empty the tanks after system shutdown or before cleaning, the promoter can be easily removed by just pulling the string attached to it. This is a great advantage in practical operation.

Example 14

Twenty grams of the capric acid granules prepared in Example 1 were put into a box the six sides of which were made of a polypropylene net having a mesh opening of 0.7 mm. Thus, a denitrification promoter of the appearance shown in FIG. 4 was fabricated.

Figure 4:
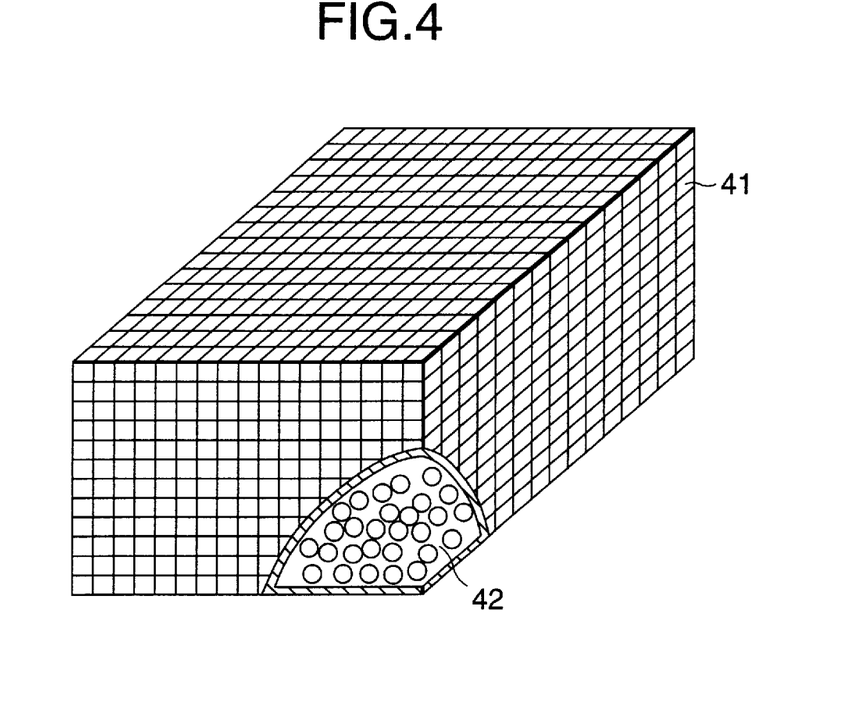
FIG. 4 is a sketch of the denitrification promoter used in Example 14.

In FIG. 4, numeral 41 refers to the box made of the polypropylene net having a mesh opening of 0.7 mm, and 42 refers to the capric acid granules.

The polypropylene net does not let the capric acid particles spill out but is permeable to water (such as wastewater), thereby allowing contact between the capric acid particles and water.

A string was attached to the thus prepared denitrification promoter, which was then charged into each of the aerobic, anaerobic and settling tanks in apparatus 2. The total nitrogen content at the outlet was measured 24 hours later.

As a comparison, the same experiment was conducted except that no promoter was charged. The total nitrogen content was measured by the same method.

The results of the respective experiments are shown in Table 14 as Example 14 and Comparative Example 14.

TABLE 14

| | Total N at outlet, ppm |
|---|---|
| Example 14 (promoter added into aerobic tank) | 12.1 |
| Example 14 (promoter added into anaerobic tank) | 8.1 |
| Example 14 (promoter added into settling tank) | 6.5 |
| Comparative Example 14 (no promoter added) | 31.2 |

As Table 4 shows, irrespective of whether the denitrification promoter of Example 14 was added into the aerobic tank, anaerobic tank or the settling tank, the total nitrogen content was lower than in the comparative case where no promoter was added.

The denitrification promoter of Example 14 is protected against spillage from tanks. In addition, if it becomes necessary to empty the tanks after system shutdown or before cleaning, the promoter can be easily removed by just pulling the string attached to it. This is a great advantage in practical operation.

Example 15

Figure 5:
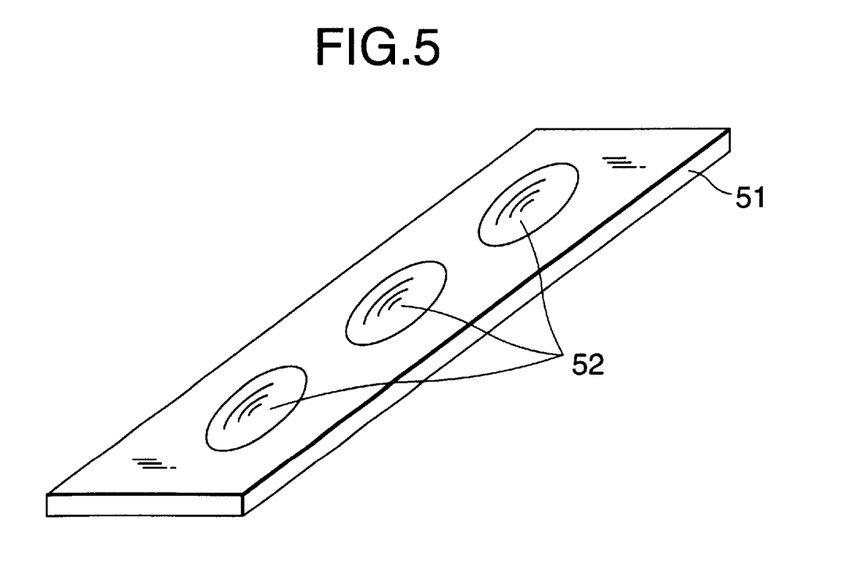
FIG. 5 is a sketch of the denitrification promoter used in Example 15.

Capric acid (guaranteed reagent) was heated to melt at 85° C. and cast into an aluminum mold (35 cm×10 cm×5 cm) having three circular raised spots (7.5 cm dia.) in the central area; thus, a denitrification promoter of the appearance shown in FIG. 5 was fabricated.

In FIG. 5, numeral 51 refers to the slab or bar of capric acid and 52 refers to each of the circular recesses in the slab.

A string was attached to the thus prepared denitrification promoter, which was then charged into each of the aerobic, anaerobic and settling tanks in apparatus 2. The total nitrogen content at the outlet was measured 24 hours later.

As a comparison, the same experiment was conducted except that no promoter was charged. The total nitrogen content was measured by the same method.

The results of the respective experiments are shown in Table 15 as Example 15 and Comparative Example 15.

TABLE 15

|  | Total N at outlet, ppm |
| --- | --- |
| Example 15 (promoter added into aerobic tank) | 9.1 |
| Example 15 (promoter added into anaerobic tank) | 10.8 |
| Example 15 (promoter added into settling tank) | 10.2 |
| Comparative Example 15 (no promoter added) | 25.4 |

As Table 15 shows, irrespective of whether the denitrification promoter of Example 15 was added into the aerobic tank, anaerobic tank or the settling tank, the total nitrogen content was lower than in the comparative case where no promoter was added.

The denitrification promoter of Example 15 is protected against spillage from tanks. In addition, if it becomes necessary to empty the tanks after system shutdown or before cleaning, the promoter can be easily removed by just pulling the string attached to it. This is a great advantage in practical operation.

Example 16

Ten grams of the capric acid granules prepared in Example 1 were added to a 2% acrylic emulsion and mixed well. Nonwoven polypropylene fabric having an areal density of 36 g/cm$^2$ was immersed in the resulting mixture for 3 hours, stripped of excess water by squeezing with a mangle, and dried by heating at 75° C. for 4 hours to prepare a denitrification promoter which had the capric acid granules immobilized on the nonwoven fabric as shown in FIG. 6.

Figure 6:
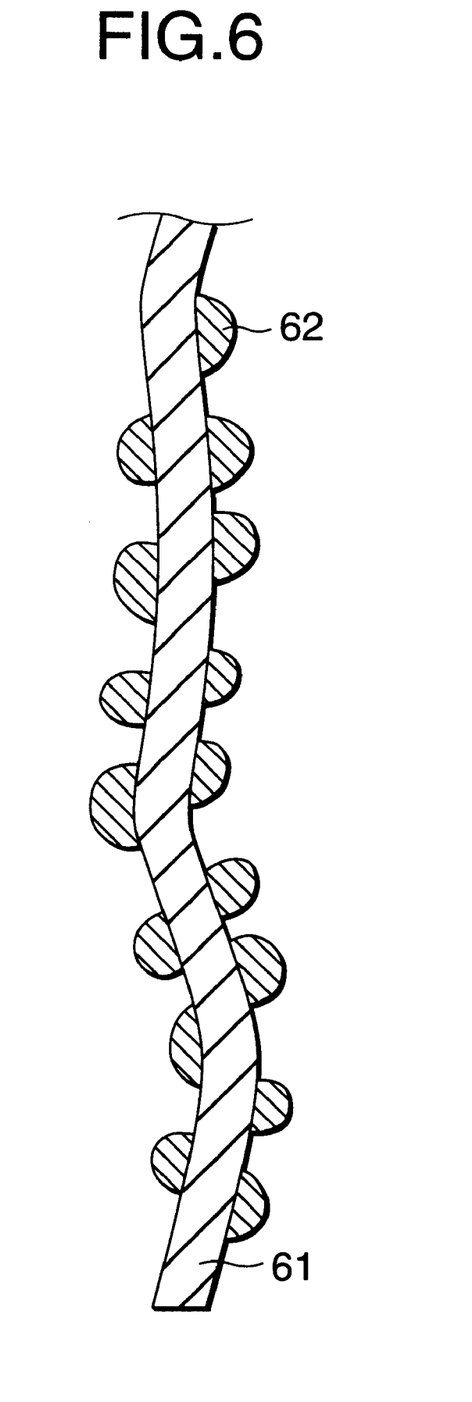
FIG. 6 is a sketch of the denitrification promoter used in Example 16.

In FIG. 6, numeral 61 refers to the nonwoven polypropylene fabric having an areal density of 36 g/cm$^2$ and 62 refers to one of the capric acid granules adhering to the nonwoven polypropylene fabric with the aid of the acrylic emulsion.

The thus prepared denitrification promoter was charged into each of the aerobic, anaerobic and settling tanks in apparatus 2. The total nitrogen content at the outlet was measured 24 hours later.

As a comparison, the same experiment was conducted except that no promoter was charged. The total nitrogen content was measured by the same method.

The results of the respective experiments are shown in Table 16 as Example 16 and Comparative Example 16.

TABLE 16

|  | Total N at outlet, ppm |
| --- | --- |
| Example 16 (promoter added into aerobic tank) | 15.3 |
| Example 16 (promoter added into anaerobic tank) | 4.2 |
| Example 16 (promoter added into settling tank) | 6.5 |
| Comparative Example 16 (no promoter added) | 36.1 |

As Table 16 shows, irrespective of whether the denitrification promoter of Example 16 was added into the aerobic tank, anaerobic tank or the settling tank, the total nitrogen content was lower than in the comparative case where no promoter was added.

The denitrification promoter of Example 16 allows for uniform and efficient contact between wastewater and the principal component capric acid and is protected against spillage from tanks. In addition, if it becomes necessary to empty the tanks after system shutdown or before cleaning, the promoter can be easily removed.

Example 17

The capric acid granules prepared in Example 1 were heated to 85° C. and impregnated under pressure into nonwoven polypropylene fabric having an areal density of 25 g/cm$^2$; the thus prepared denitrification promoter had the capric acid granules immobilized directly on the nonwoven fabric.

The denitrification promoter was charged into each of the aerobic, anaerobic and settling tanks in apparatus 2. The total nitrogen content at the outlet was measured 24 hours later.

As a comparison, the same experiment was conducted except that no promoter was charged. The total nitrogen content was measured by the same method.

The results of the respective experiments are shown in Table 17 as Example 17 and Comparative Example 17.

TABLE 17

|  | Total N at outlet, ppm |
| --- | --- |
| Example 17 (promoter added into aerobic tank) | 10.4 |
| Example 17 (promoter added into anaerobic tank) | 7.7 |
| Example 17 (promoter added into settling tank) | 6.5 |
| Comparative Example 17 (no promoter added) | 32.2 |

As Table 17 shows, irrespective of whether the denitrification promoter of Example 17 was added into the aerobic tank, anaerobic tank or the settling tank, the total nitrogen content was lower than in the comparative case where no promoter was added.

The denitrification promoter of Example 17 is protected against spillage from tanks and allows for uniform and efficient contact between wastewater and the principal component capric acid. In addition, if it becomes necessary to empty the tanks after system shutdown or before cleaning, the promoter can be easily removed.

Although not mentioned in the foregoing examples, it should be understood that any known additives for wastewater treatment can be applied as needed on the condition that the primary purpose of the present invention is not compromised.

Applicable additives may be exemplified by flocculants, settling promoters, sludge control agents, bacterium activators and bulking control agents.

As will be understood from the foregoing description, the denitrification promoters of the present invention and methods of water treatment using such denitrification promoters enable denitrification reactions to occur in water treatment facilities using a single aerobic tank (an aeration tank only) without continuous addition of methanol or other hydrogen donors. In addition, if the specified materials which are the core of the invention are chosen, no special and expensive techniques or production processes need be used. As a further advantage, the denitrification promoters of the invention can be stored for a prolonged time since they do not use living organisms.

What is claimed is:

1. A solid denitrification promoter, wherein the denitrification promoter comprises a straight-chained saturated monocarboxylic acid having 6 or more carbon atoms and a carrier carrying said monocarboxylic acid to support the denitrification promoter.

2. The solid denitrification promoter according to claim 1, wherein the carrier is based on at least one of cellulose, polyvinyl alcohol and polyethylene glycol.

3. A solid denitrification promoter, wherein the solid denitrification promoter comprises an alcohol having 12 or more carbon atoms and a carrier carrying said alcohol to support the denitrification promoter.

4. The solid denitrification promoter according to claim 3, wherein the carrier is based on at least one of cellulose, polyvinyl alcohol and polyethylene glycol.

5. A method of water treatment, comprising the step of adding a denitrification promoter comprising a carboxylic acid having 6 or more carbon atoms into any one of an aerobic tank, an anaerobic tank and a settling tank, the denitrification promoter being added in an amount effective to facilitate substantial reduction in total nitrogen content of the water being treated in the tank.

6. The method according to claim 5, wherein particles of the denitrification promoter have a size of no more than 100 mm.

7. The method of water treatment, wherein a water-infiltrable bag or box contains the denitrification promoter according to claim 5, wherein the denitrification promoter is installed in any one of an aerobic tank, an anaerobic tank, and a settling tank.

8. The method according to claim 7, wherein the bag is formed of nonwoven or woven fabric having an areal density of from 5 g/m$^2$ to 45 g/m$^2$.

9. The method according to claim 7, wherein the box comprises meshed walls having openings ranging from 20 μm to 4 cm in size.

10. The method of water treatment in which a bar or a rod of the denitrification promoter according to claim 5 is installed in any one of an aerobic tank, an anaerobic tank and a settling tank.

11. The method according to claim 10, wherein the bar or rod has at least one convex or concave surface.

12. The method of water treatment in which a denitrification promoter according to claim 5 is immobilized on at least one of (1) a string, (2) a woven fabric sheet and (3) a nonwoven fabric sheet and installed in any one of an aerobic tank, an anaerobic tank and a settling tank.

13. A method according to claim 5, wherein the denitrification promoter acts as a hydrogen donor in the removal of nitrogen by denitrification reaction.

14. A method of water treatment, wherein a denitrification promoter comprising any one of (1) a carboxylic acid having 6 or more carbon atoms or (2) an alcohol having 12 or more carbon atoms is added into any one of an aerobic tank, an anaerobic tank and a settling tank, wherein a size of the particles is defined so that an anaerobic environment can locally be created to favor the progress of denitrifying reactions by local pressure drop due to "Bernouilli's principle", caused by a flow of aerating gas or water streams at the interface between the carboxylic acid or alcohol and the water, caused by movement of the particles in the tank to which the particles are added.

15. A method of water treatment in which a bar or a rod of denitrification promoter comprising any one of (1) a carboxylic acid having 6 or more carbon atoms or (2) an alcohol having 12 or more carbon atoms is added into any one of an aerobic tank, an anaerobic tank and a settling tank, wherein the denitrification promoter is shaped so that an anaerobic environment can locally be created to favor the progress of denitrifying reactions by local pressure drop due to "Bernouilli's principle", caused by a flow of aerating gas or water streams at the interface between the carboxylic acid or alcohol and the water.

16. A method of water treatment in which a bar or a rod of denitrification promoter comprising any one of (1) a carboxylic acid having 6 or more carbon atoms or (2) an alcohol having 12 or more carbon atoms is added into any one of an aerobic tank, an anaerobic tank and a settling tank, wherein the bar or rod has at least one convex or concave surface formed so that an anaerobic environment can locally be created to favor the progress of denitrifying reactions by local pressure drop due to "Bernouilli's principle", caused by a flow of aerating gas or water streams at the interface between the carboxylic acid or alcohol and the water.

17. A method of water treatment, wherein a denitrification promoter comprising any one of (1) a carboxylic acid having 6 or more carbon atoms or (2) an alcohol having 12 or more carbon atoms is added into any one of an aerobic tank, an anaerobic tank and a settling tank, wherein the denitrification promoter is immobilized on at least one of (1) a string, (2) a woven fabric sheet, or (3) a nonwoven fabric sheet, the denitrification promoter being immobilized so that an anaerobic environment can locally be created to favor the progress of denitrifying reactions by local pressure drop due to "Bernouilli's principle", caused by a flow of aerating gas or water streams at the interface between the carboxylic acid or alcohol and the water.

18. A method of water treatment, comprising the step of adding a denitrification promoter comprising any one of (1) a carboxylic acid having 6 or more carbon atoms or (2) an alcohol having 12 or more carbon atoms into an aerobic tank, the denitrification promoter being added in an amount effective to facilitate substantial reduction in total nitrogen content of the water being treated in the tank, and the denitrification of the treatment water in the aerobic tank occurs simultaneously with nitrification of said treatment water in said aerobic tank.

19. A method according to claim 18, wherein the denitrification of the treatment water in the aerobic tank occurs without addition of methanol or other hydrogen donors.

20. A method according to claim 18, wherein the denitrification promoter creates an anaerobic environment in a portion of the aerobic tank.

21. A method of water treatment, comprising the step of adding a denitrification promoter comprising any one of (1) a carboxylic acid having 6 or more carbon atoms or (2) an alcohol having 12 or more carbon atoms into any one of an aerobic tank and a settling tank, the denitrification promoter being added in an amount effective to facilitate substantial reduction in total nitrogen content of the water being treated in the tank.

22. The method according to claim 21, wherein particles of the denitrification promoter have a size of no more than 100 mm.

23. The method of water treatment, wherein a water-infiltrable bag or box contains the denitrification promoter according to claim 21, wherein the denitrification promoter is installed in any one of an aerobic tank, an anaerobic tank, and a settling tank.

24. The method according to claim 23, wherein the bag is formed of nonwoven or woven fabric having an areal density of from 5 g/m² to 45 g/m².

25. The method according to claim 23, wherein the box comprises meshed walls having openings ranging from 20 μm to 4 cm in size.

26. The method of water treatment in which a bar or a rod of the denitrification promoter according to claim 21 is installed in any one of an aerobic tank and a settling tank.

27. The method according to claim 26, wherein the bar or rod has at least one convex or concave surface.

28. The method of water treatment in which a denitrification promoter according to claim 21 is immobilized on at least one of (1) a string, (2) a woven fabric sheet and (3) a nonwoven fabric sheet and installed in any one of an aerobic tank and a settling tank.

29. A method according to claim 21, wherein the denitrification promoter acts as a hydrogen donor in the removal of nitrogen by denitrification reaction.

* * * * *